United States Patent
Masuda et al.

(10) Patent No.: US 12,198,885 B2
(45) Date of Patent: Jan. 14, 2025

(54) FUSE AND ON-VEHICLE DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP); Pacific Engineering Corporation, Ogaki (JP)

(72) Inventors: Ryosuke Masuda, Yokkaichi (JP); Masayuki Kato, Yokkaichi (JP); Akihiro Oda, Yokkaichi (JP); Yu Kuya, Ogaki (JP); Chikako Okamoto, Ogaki (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP); Pacific Engineering Corporation, Ogaki (JP)

( * ) Notice: Subject to any disclaimer, the term of this patent is extended or adjusted under 35 U.S.C. 154(b) by 73 days.

(21) Appl. No.: 18/254,977

(22) PCT Filed: Nov. 15, 2021

(86) PCT No.: PCT/JP2021/041897
§ 371 (c)(1),
(2) Date: May 30, 2023

(87) PCT Pub. No.: WO2022/118642
PCT Pub. Date: Jun. 9, 2022

(65) Prior Publication Data
US 2024/0021395 A1 Jan. 18, 2024

(30) Foreign Application Priority Data
Dec. 4, 2020 (JP) .................................. 2020-202068

(51) Int. Cl.
*H01H 85/20* (2006.01)

(52) U.S. Cl.
CPC ...... *H01H 85/2045* (2013.01); *H01H 85/205* (2013.01); *H01H 2085/2055* (2013.01); *H01H 2085/208* (2013.01)

(58) Field of Classification Search
CPC ............. H01H 85/2045; H01H 85/205; H01H 2085/2055; H01H 2085/208
(Continued)

(56) References Cited

U.S. PATENT DOCUMENTS

| | | | |
|---|---|---|---|
| 6,608,546 B2* | 8/2003 | Andoh | H01H 85/0417 337/380 |
| 7,050,281 B2* | 5/2006 | Ohta | H02H 1/0015 361/104 |

(Continued)

FOREIGN PATENT DOCUMENTS

| | | |
|---|---|---|
| JP | S62-089750 U | 6/1987 |
| JP | H10-321107 A | 12/1998 |

(Continued)

OTHER PUBLICATIONS

International Search Report, Application No. PCT/JP2021/041897, mailed Jan. 11, 2022. ISA/Japan Patent Office.

*Primary Examiner* — Alfonso Perez Borroto
(74) *Attorney, Agent, or Firm* — Honigman LLP; John Chau; Jonathan P. O'Brien (57) ABSTRACT

An on-vehicle device is provided with a fuse. A plurality of terminals each have a long-plate shape and are aligned with each other. A fusible portion is connected to two of the plurality of terminals. A housing covers a part of the plurality of terminals and the fusible portion and has heat resistance equal to or higher than 300 degrees. Current flows through the fusible portion. The fusible portion is blown out (Continued)

in the case where the temperature of the fusible portion exceeds a predetermined temperature.

5 Claims, 9 Drawing Sheets

(58) Field of Classification Search
USPC .......................................................... 307/9.1
See application file for complete search history.

(56) References Cited

U.S. PATENT DOCUMENTS

| | | | |
|---|---|---|---|
| 2003/0055160 A1* | 3/2003 | Yamazaki | C08L 77/02 |
| | | | 524/606 |
| 2004/0070485 A1 | 4/2004 | Andoh et al. | |
| 2004/0196135 A1* | 10/2004 | Clair | H01H 85/0417 |
| | | | 337/198 |
| 2009/0179727 A1 | 7/2009 | Urrea et al. | |

FOREIGN PATENT DOCUMENTS

| | | |
|---|---|---|
| JP | 2002-038295 A | 2/2002 |
| JP | 2005-166410 A | 6/2005 |
| JP | 2011-076772 A | 4/2011 |

* cited by examiner

FUSE AND ON-VEHICLE DEVICE

CROSS-REFERENCE TO RELATED APPLICATIONS

This application is the U.S. national stage of PCT/JP2021/041897 filed on Nov. 15, 2021, which claims priority of Japanese Patent Application No. JP 2020-202068 filed on Dec. 4, 2020, the contents of which are incorporated herein.

TECHNICAL FIELD

The present disclosure relates to a fuse and an on-vehicle device.

BACKGROUND

Japanese Patent Application Laid-Open No. 2011-76772 discloses a fuse for preventing overcurrent from flowing in electrical equipment. The fuse is provided, for example, in an on-vehicle device. The fuse described in Japanese Patent Application Laid-Open No. 2011-76772 is a so-called blade type fuse. The blade-type fuse has two terminals formed in a long plate shape. The two terminals are connected to a fusible portion. A part of each of the two terminals and the fusible portion are covered with a housing. Current flows through one of the terminals, the fusible portion and the other one of the terminals in this order. The fusible portion is blown out to thereby prevent overcurrent from flowing.

In Japanese Patent Application Laid-Open No. 2011-76772, a fuse holder to which the blade-type fuse is inserted is mounted on a circuit board. If the fusible portion of the fuse is blown out, the fuse is removed from the fuse holder for insertion of a new fuse into the fuse holder.

In Japanese Patent Application Laid-Open No. 2011-76772, the blade-type fuse is inserted into the fuse holder to realize an on-vehicle device. The on-vehicle device, which is configured to have the fuse holder mounted on the circuit board, causes a problem of increasing its size. Since inside a vehicle, a large number of devices are disposed in a limited space, the size of each of the on-vehicle devices is preferably small.

A method of achieving a small-sized on-vehicle device may include directly attaching a blade-type fuse to a circuit board with solder. Multiple components, which are different from a fuse, are generally soldered onto a circuit board. A method of attaching a component with solder may include a reflow soldering. In the reflow soldering method, paste-like solder is applied to circuit board plating that coats the circuit board, and the electrode of the component is placed on the solder. In this state, hot air is blown, or infrared rays are irradiated. This causes the solder to melt and connect the electrode of the component to the circuit board plating by the solder.

In the case where the components other than fuse are mounted on the circuit board using the reflow soldering method, a blade-type fuse is preferably attached to the circuit board using the reflow soldering method as well in order to achieve the process of attaching all the components to the circuit board at a low cost. The blade-type fuse, however, is manufactured with the assumption that it is to be inserted into the fuse holder. Thus, the blade-type fuse is not a component suitable for attachment using the reflow soldering method at the present.

Hence, the object is to provide a fuse structured to be suitable for attachment to the circuit board using the reflow soldering method and an on-vehicle device provided with this fuse.

SUMMARY

A fuse according to one aspect of the present disclosure is a fuse provided in an on-vehicle device comprising: a plurality of terminals each having a long-plate shape that are aligned with each other; a fusible portion connected to two of the plurality of terminals; and a housing covering the fusible portion and a part of the plurality of terminals, and current flows through the fusible portion, the fusible portion is blown out in the case where a temperature of the fusible portion exceeds a predetermined temperature, the housing has heat resistance equal to or higher than 300 degrees, each terminal has a metal body, terminal plating made of tin covering a surface of the metal body, a first plate portion having a long-plate shape a part of which is covered with the housing, and a second plate portion connected to the first plate portion, for each of the plurality of terminals, one end of the first plate portion protrudes from(beyond) a common face of the housing, the second plate portion protrudes from a part of a leading end surface of the first plate portion that protrudes from(beyond) the housing, and a cross-sectional area of the second plate portion is smaller than a cross sectional area of the first plate portion.

An on-vehicle device according to one aspect of the present disclosure comprises a fuse and a circuit board to which the fuse is attached, and the fuse has a plurality of terminals each having a long-plate shape that are aligned with each other, a fusible portion connected to two of the plurality of terminals, a housing covering the fusible portion and a part of the plurality of terminals and having heat resistance, current flows through the fusible portion, the fusible portion is blown out in the case where a temperature of the fusible portion is equal to or higher than a predetermined temperature, the housing has heat resistance equal to or higher than 300 degrees, each terminal has a metal body, terminal plating made of tin covering a surface of the metal body, a first plate portion having a long-plate shape a part of which is covered with the housing, and a second plate portion connected to the first plate portion, and for each of the plurality of terminals, one end of the first plate portion protrudes from(beyond) a common face of the housing, the second plate portion protrudes from a part of a leading end surface of the first plate portion that protrudes from(beyond) the housing, a cross-sectional area of the second plate portion is smaller than a cross sectional area of the first plate portion, the circuit board has an insulating substrate, a plurality of through holes that penetrate the insulating substrate, and a plurality of substrate plating coating the insulating substrate, and the plurality of terminals are respectively inserted into the plurality of through holes and connected to the plurality of substrate plating with solder.

Effect

According to this disclosure, the fuse is structured to be suitable for attachment to the circuit board using the reflow soldering method.

BRIEF DESCRIPTION OF DRAWINGS

FIG. 5 is an illustrative view of terminals and a fusible portion obtained when FIG. 1 is viewed from above.

DETAILED DESCRIPTION OF PREFERRED EMBODIMENTS

Embodiments of the present disclosure are first listed and described. At least parts of the embodiments described below may arbitrarily be combined.

A fuse according to one aspect of the present disclosure is a fuse provided in an on-vehicle device comprising: a plurality of terminals each having a long-plate shape that are aligned with each other; a fusible portion connected to two of the plurality of terminals; and a housing covering the fusible portion and a part of the plurality of terminals, and current flows through the fusible portion, the fusible portion is blown out in the case where a temperature of the fusible portion exceeds a predetermined temperature, the housing has heat resistance equal to or higher than 300 degrees celsius, each terminal has a metal body, terminal plating made of tin covering a surface of the metal body, a first plate portion having a long-plate shape a part of which is covered with the housing, and a second plate portion connected to the first plate portion, for each of the plurality of terminals, one end of the first plate portion protrudes from(beyond) a common face of the housing, the second plate portion protrudes from a part of a leading end surface of the first plate portion that protrudes from(beyond) the housing, and a cross-sectional area of the second plate portion is smaller than a cross sectional area of the first plate portion.

In the aspect described above, in the case where attachment to the circuit board using the reflow soldering method is performed, the housing is blown with hot air or irradiated with infrared rays. This raises the temperature of the housing. The housing has heat resistance. Thus, in the case where the temperature of the housing is equal to or lower than X degrees, no deformation or no melting occurs to the housing. Here, X is a positive real number. As to the housing, the heat resistance equal to or higher than 300 degrees means that X is equal to or more than 300. If no deformation or no melting occurs to the housing, the shape of the housing is maintained. Since the housing has heat resistance equal to or higher than 300 degrees, no melting or no deformation caused by the blowing of hot air or the irradiation of infrared rays occurs to the housing. This structure is consequently suitable for attachment to the circuit board using the reflow soldering method.

Furthermore, at each terminal, the surface of the metal body is coated with tin terminal plating. Solder usually contains a tin component. Accordingly, the terminal coated with tin terminal plating has high solder conformability, that is, high wettability. Thus, the solder strongly adheres to the terminal.

Moreover, the second plate portion protrudes from the leading end surface of the first plate portion that protrudes beyond the housing, which achieves a stepped structure. For the circuit board, a through hole is provided on the insulating substrate, and the inner surface of the through hole and the insulating substrate around the through hole are coated with the substrate plating. For example, a through hole having an area slightly larger than the cross-sectional area of the second plate portion is provided. When the second plate portion is inserted into the through hole in this state, the first plate portion does not pass through the through hole and abuts against the substrate plating around the through hole. At this time, the housing is spaced apart from the circuit board by the first plate portion. This makes it possible to easily form fillet-shaped solder when the terminal is attached to the circuit board with solder. Formation of fillet-shaped solder means achievement of favorable attachment.

Additionally, the terminal is inserted into the through hole while paste-like solder is applied to the substrate plating. The stepped structure achieved as described above prevents the housing from contacting the paste-like solder when the terminal is inserted into the through hole. This reduces the probability of formation of ball-like solder in the case where solder is melted by the reflow soldering method.

In addition, the second plate portion has a cross-sectional area smaller than the first plate portion, and the second plate portion is slim. Thus, the through hole with a small area can be used as a through hole through which the second plate portion is to be inserted. Here, the gap between the second plate portion and the through hole is narrow. Thus, even if hot air is blown into the housing, for example, the second plate portion, i.e., the fuse does not tilt too much and the housing stands substantially perpendicular to the board surface of the circuit board. As a result, in mounting by the reflow soldering method, the housing need not be fixed in a substantially upright position using a jig, resulting in achievement of inexpensive mounting.

n the fuse according to one aspect of the present disclosure, two terminals of the plurality of terminals positioned on both sides in an alignment direction have two second plate portions positioned inward in the alignment direction.

In the aspect described above, as to the two terminals positioned on both sides in the alignment direction, the distance between the two second plate portions is short. In the structure in which the second plate portions are inserted into the through holes on the circuit board, the distance between the two through holes into which the two terminals positioned on both sides are to be inserted is short. Generally, the inner surface of the through holes and the insulating substrate around the through holes are coated with the substrate plating, and the terminals are connected to the substrate plating with solder. In some cases, the circuit board provided with the wiring pattern inside the insulating substrate is used as a circuit board to which components are attached. No wiring pattern is often formed between the two adjacent through holes on the surface and the inside of the insulating substrate. In the case where the distance between the through holes into which the two terminals are to be inserted is short, a permission area where the wiring pattern can be formed is wide on the surface and the inside of the insulating substrate, which increases the design flexibility of the wiring pattern.

In the fuse according to one aspect of the present disclosure, the leading end surfaces of a plurality of the first plate portions that protrude from (beyond) the housing are flush with each other.

In the aspect describe above, a plurality of terminals are respectively inserted into a plurality of through holes formed on the circuit board. For example, in the case where the area of each of the through holes is slightly larger than the cross-sectional area of the second plate portion, when the plurality of second plate portions are inserted into the plurality of through holes, the plurality of the first plate portions abut against the circuit board around the respective through holes. The leading end surfaces of the plurality of first plate portions are flush with each other. Thus, the fuse is stably supported by the circuit board.

An on-vehicle device according to one aspect of the present disclosure comprises a fuse and a circuit board to which the fuse is attached, and the fuse has a plurality of terminals each having a long-plate shape that are aligned with each other, a fusible portion connected to two of the plurality of terminals, a housing covering the fusible portion and a part of the plurality of terminals and having heat resistance, current flows through the fusible portion, the fusible portion is blown out in the case where a temperature of the fusible portion is equal to or higher than a predetermined temperature, the housing has heat resistance equal to or higher than 300 degrees, each terminal has a metal body, terminal plating made of tin covering a surface of the metal body, a first plate portion having a long-plate shape a part of which is covered with the housing, and a second plate portion connected to the first plate portion, and for each of the plurality of terminals, one end of the first plate portion protrudes from (beyond) a common face of the housing, the second plate portion protrudes from a part of a leading end surface of the first plate portion that protrudes from (beyond) the housing, a cross-sectional area of the second plate portion is smaller than a cross sectional area of the first plate portion, the circuit board has an insulating substrate, a plurality of through holes that penetrate the insulating substrate, and a plurality of substrate plating coating the insulating substrate, and the plurality of terminals are respectively inserted into the plurality of through holes and connected to the plurality of substrate plating with solder.

In the aspect described above, the plurality of terminals of the fuse are respectively inserted into the plurality of the through holes formed on the insulating substrate. Then, the plurality of terminals are connected to a plurality of substrate plating with solder. This realizes a device.

Concrete examples of the fuse according to the embodiments of the present disclosure will be described below with reference to the drawings. The scope of the present disclosure is defined by the appended claims, not by the above-mentioned exemplification, and all changes that fall within the meanings and the bounds of the claims, or equivalence of such meanings and bounds are intended to be embraced by the claims.

First Embodiment

Structure of Fuse

Figure 1:
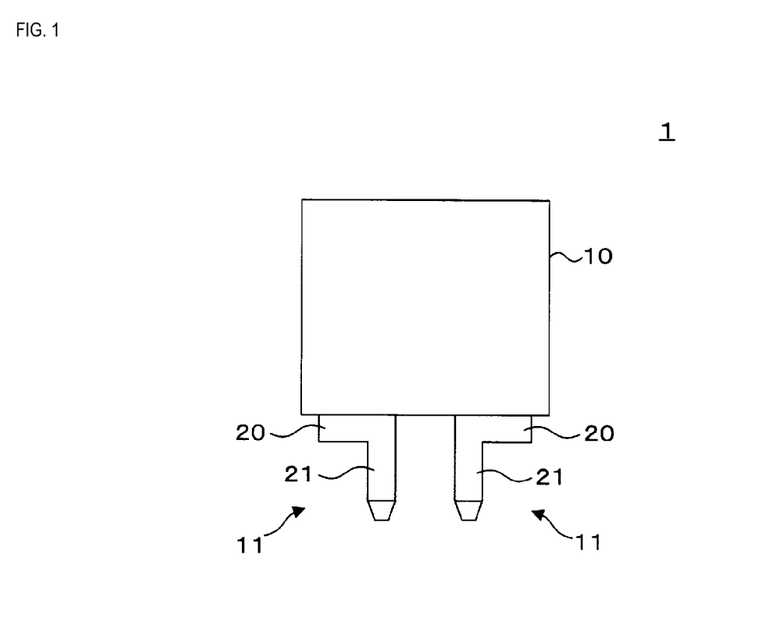
FIG. 1 is a front view of a fuse according to a first embodiment.
Figure 2:
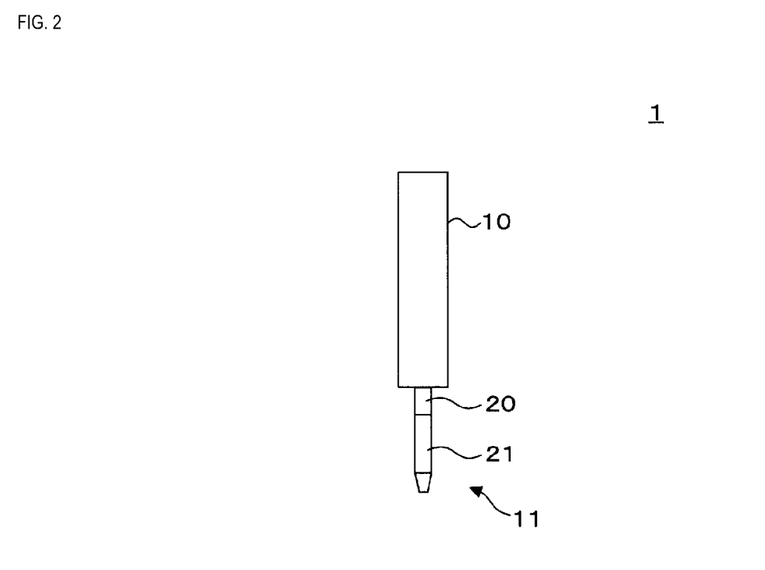
FIG. 2 is a side view of the fuse.

FIG. 1 is a front view of a fuse 1 according to a first embodiment. FIG. 2 is a side view of the fuse 1. The fuse 1 has a housing 10 made of resin. As illustrated in FIG. 1 and FIG. 2, the fuse 1 has two terminals 11 protruding beyond one common (same) face of the housing 10. Each terminal 11 has conductivity.

Figure 3:
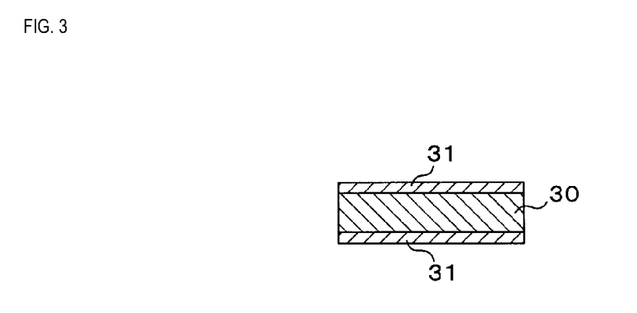
FIG. 3 is a cross-sectional view of a terminal.

FIG. 3 is a cross-sectional view of the terminal 11. Each terminal 11 has a metal body 30 with a long-plate shape. For each terminal 11, plate-like surfaces of the metal body 30 on both sides are coated with terminal plating 31 made of tin (Sn). The plate-like surfaces correspond to wide surfaces of a plate. The metal body 30 is exposed at both side surfaces of each terminal 11. The metal body 30 and the terminal plating 31 have conductivity. The metal body 30 is produced, for example, using zinc alloys. The metal body 30 and the terminal plating 31 are not illustrated in the drawings other than FIG. 3.

Note that the terminal plating 31 may coat the surfaces of the metal body 30 different from the plate-like surfaces, e.g., the side surfaces.

Figure 4:
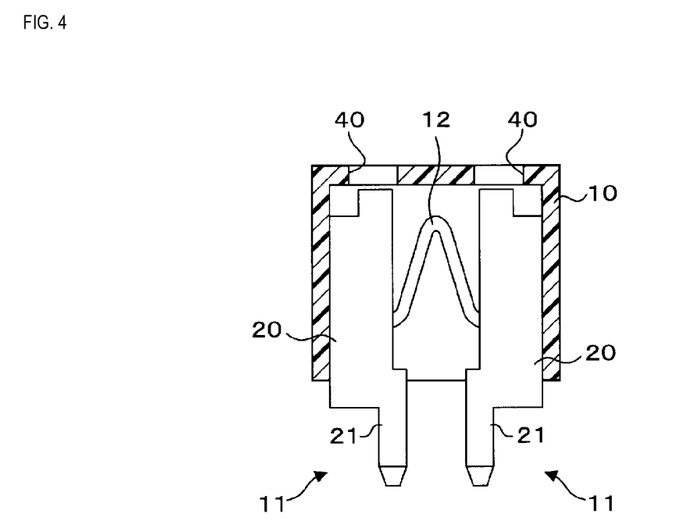
FIG. 4 is a cross-sectional view of the fuse.

FIG. 4 is a cross-sectional view of the fuse 1. As illustrated in FIG. 1, FIG. 2 and FIG. 4, the housing 10 has a box shape with one side open. A part of each of the two terminals 11 is covered with the housing 10. As described above, the two terminals 11 protrude beyond one common face of the housing 10. Here, the common face corresponds to an open side and is located at the bottom in FIG. 1, FIG. 2 and FIG. 4. As illustrated in FIG. 4, the two terminals 11 are aligned with each other inside the housing 10. The two terminals 11 are connected to a rod-shaped fusible portion 12. The fusible portion 12 has conductivity. The fusible portion 12 is also covered with the housing 10.

An electrical circuit with the fuse 1 includes a circuit in which the fuse 1 is connected to a battery and a load. Specifically, one of the terminals 11 of the fuse 1 is connected to the positive electrode of the battery. The other one of the terminals 11 of the fuse 1 is connected to one end of the load via a switch. The negative electrode of the battery and the other end of the load are grounded. The load is the electrical device mounted on the vehicle. In such an electrical circuit, if the switch is on, current flows through the one terminal 11, the fusible portion 12 and the other terminal 11 in this order.

In the case where current flows through the fusible portion 12, the fusible portion 12 generates heat. The higher the current value of the current flowing through the fusible portion 12 is, the greater the amount of heat generated by the fusible portion 12 is. As to the fusible portion 12, if the amount of heat generation per unit time exceeds the amount of heat dissipation per unit time, the temperature of the fusible portion 12 rises. If the current value of the current flowing through the fusible portion 12 exceeds a predetermined value, the temperature of the fusible portion 12 continues to rise. If the temperature of the fusible portion 12 exceeds a predetermined temperature, e.g., 420 degrees, the fusible portion 12 is blown out, which stops flowing of the current through the fusible portion 12. This, as a result, prevents overcurrent from flowing through the load.

Figure 5:
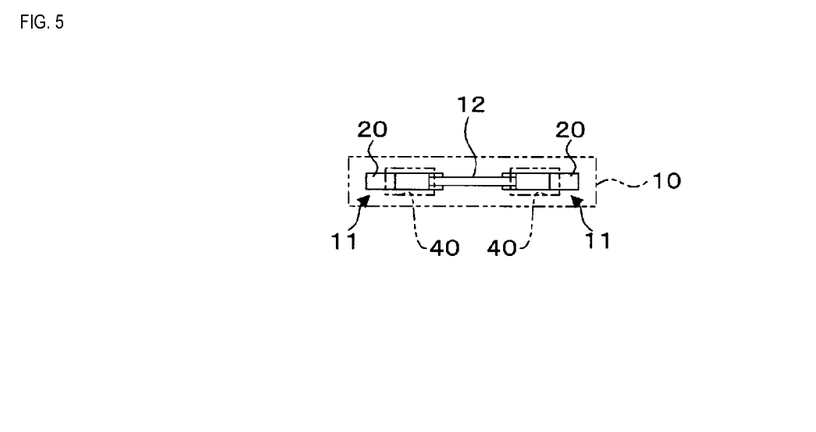

FIG. 5 is an illustrative view of the two terminals 11 and the fusible portion 12 obtained when FIG. 1 is viewed from above. As illustrated in FIG. 4 and FIG. 5, each terminal 11 has a long-plate shape. The plate-like surfaces of the two terminals 11 are aligned with each other, and FIG. 4 illustrates the plate-like surfaces of the two terminals 11. As to each of the two terminals 11, one end thereof protrudes downward in FIG. 4 beyond the common face (open side) of the housing 10.

It is preferable that the plate-like surfaces of the two terminals 11 are flush with each other.

Since each terminal 11 has a long-plate shape as described above, each fuse 1 is a blade-type fuse. Generally, the terminal of a blade-type fuse has a cross-sectional area larger than the terminal of a chip-type fuse. Thus, the blade-type fuse can be used as a fuse for a circuit through which large current flows in the case of a normal condition.

As to each terminal 11, an end of a first plate portion 20 having a long-plate shape is connected to an end of a second plate portion 21 having a long-plate shape. A part of the first plate portion 20 is covered with the housing 10. A first end of the first plate portion 20 protrudes downward in FIG. 4 beyond the common face of the housing 10 as described above. The common face of the housing 10 (virtual face defined by the edges of the housing) is in parallel with the leading end surface of the first end of the first plate portion 20. Furthermore, as to the two terminals 11, the leading end surfaces of the first ends of the two first plate portions 20 are flush with each other.

Note that the common face and the leading end surface do not need to be completely parallel, but may also be substantially parallel. Accordingly, the state in which the common face and the leading end surface are in parallel also includes a state in which the angle made by the common face and the leading end surface takes a value within a design error range. Furthermore, the fact that the two leading end surfaces are flush with each other means that no step height is practically provided between the two leading end surfaces. Accordingly, if the step height between the two leading end surfaces is a value within a design error range, the two leading end surfaces are flush with each other.

At each terminal 11, the second plate portion 21 protrudes from a part of the leading end surface at the first end of the first plate portion 20 along the lengthwise direction of the first plate portion 20. The cross-sectional area of the second plate portion 21 is smaller than the cross-sectional area of the first plate portion 20, and the second plate portion 21 is slimmer than the first plate portion 20. The first plate portion 20 and the second plate portion 21 have the same thickness, and the plate-like surface of the first plate portion 20 and the second plate portion 21 are continuous. The first plate portion 20 and the second plate portion 21 have the same lengthwise direction, the lengthwise direction corresponding to the up-down direction in FIG. 1, FIG. 2 and FIG. 4. The cross-sectional areas of the first plate portion 20 and the second plate portion 21 are areas of the cross section obtained by cutting the first plate portion 20 and the second plate portion 21 along the width direction thereof, i.e., the right-left direction in FIG. 1, FIG. 2 and FIG. 4.

Note that the first plate portion 20 and the second plate portion 21 may have substantially the same thickness, not necessarily having completely the same thickness. Accordingly, the state in which the first plate portion 20 and the second plate portion 21 have the same thickness also includes the state in which the difference in the thickness between the two falls within an error range. Furthermore, the first plate portion 20 and the second plate portion 21 may have substantially the same lengthwise direction, not necessarily having completely the same lengthwise direction. Accordingly, the state in which the first plate portion 20 and the second plate portion 21 have the same lengthwise direction also includes the state in which the angle made by the lengthwise directions of the two falls within an error range.

As to the two terminals 11, the two second plate portions 21 are positioned inward in the direction in which the two terminals 11 are aligned with each other. The alignment direction is a right-left direction in FIG. 4. Accordingly, as to the terminal 11 on the left in FIG. 4, the second plate portion 21 protrudes from the rightward edge of the leading end surface at the first end of the first plate portion 20. As to the terminal 11 on the right, the second plate portion 21 protrudes from the leftward edge of the leading end surface at the first end of the first plate portion 20. Since the two second plate portions 21 protrude as described above, the distance between the second plate portions 21 of the two terminals 11 is short. As illustrated in FIG. 1 and FIG. 2, the tip end of each of the second plate portions 21 has a truncated-pyramidal shape, and the second plate potion 21 has the cross-sectional area that increases toward the housing 10 and decreases away from the housing 10.

As illustrated in FIG. 4 and FIG. 5, the rod-shaped fusible portion 12 is located between the first plate portions 20 of the two terminals 11. One end of the fusible portion 12 is connected to a side surface of the first plate portion 20 of one of the terminals 11. The other end of the fusible portion 12 is connected to a side surface of the first plate portion 20 of the other one of the terminals 11. The two side surfaces to which the fusible portion 12 is connected face each other. The fusible portion 12 is bent and is generally in the form of V. In the example illustrated in FIG. 4, the fusible portion 12 is bent upward in FIG. 4.

Note that the fusible portion 12 is not limited to a V shape, but may have an S shape, for example.

As illustrated in FIG. 4 and FIG. 5, as to the housing 10, the surface opposed to the common face described above, that is, the top surface in FIG. 4 has two openings 40. Second ends of the first plate portions 20 of the two terminals 11 respectively face the two openings 40. The user of the fuse 1 uses a tester, for example, to measure the resistance between the two terminals 11. The user can confirm whether or not the fusible portion 12 is blown out based on the measured resistance.

Attached State of Fuse 1

Figure 6:
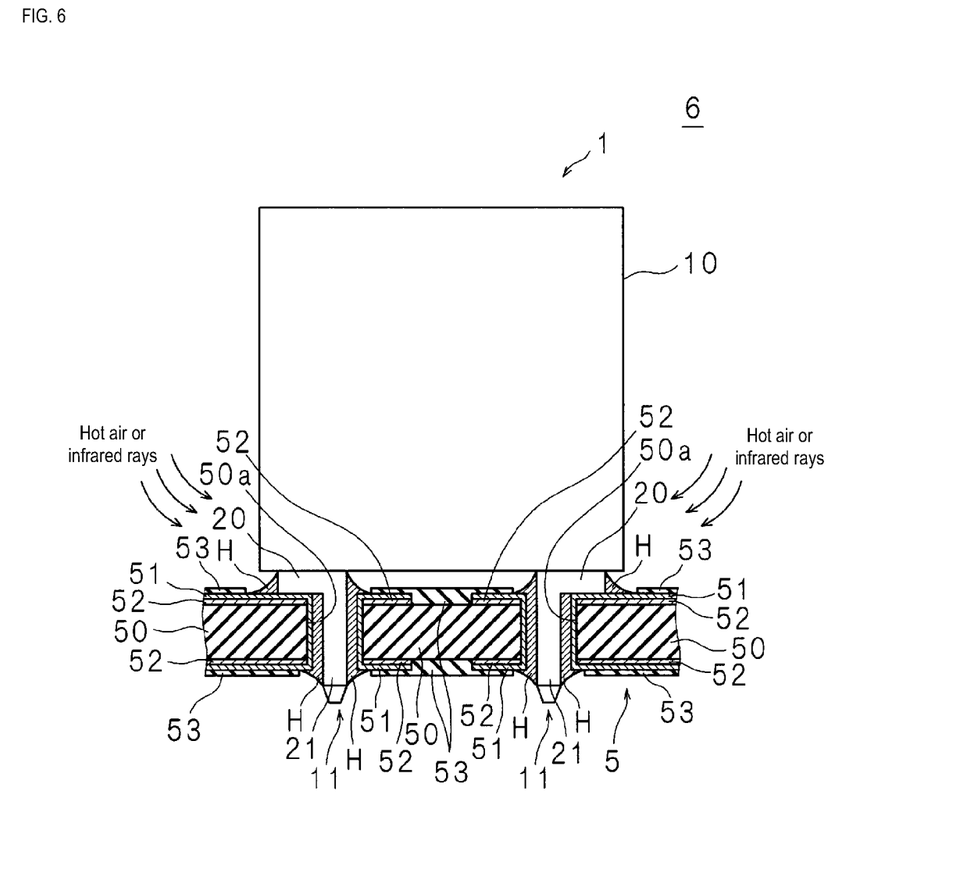
FIG. 6 is an illustrative view of the fuse attached to a circuit board.
Figure 7:
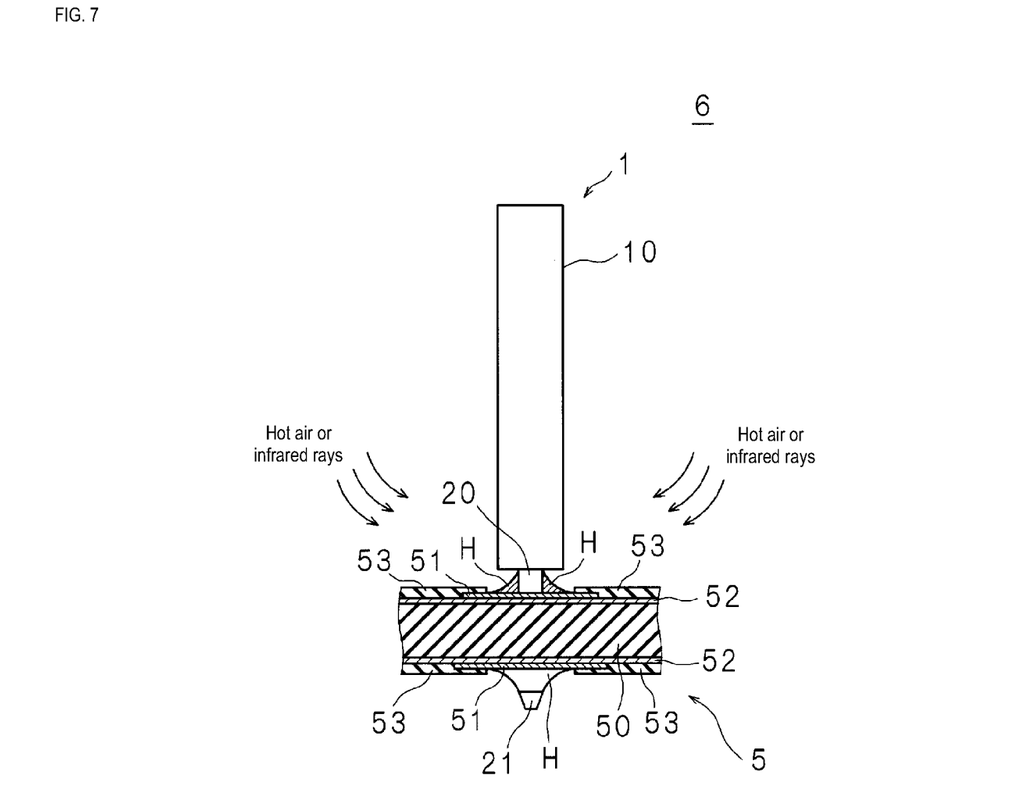
FIG. 7 is another illustrative view of the fuse attached to the circuit board.

FIG. 6 is an illustrative view of the fuse 1 attached to the circuit board 5. FIG. 7 is another illustrative view of the fuse 1 attached to the circuit board 5. The circuit board 5 is a so-called printed circuit board. The fuse 1 is attached to the circuit board 5 with solder H. FIG. 6 and FIG. 7 illustrate the state obtained after the fuse 1 has been attached to the circuit board 5 with solder H. FIG. 6 and FIG. 7 each illustrate a cross-section of the circuit board 5. As illustrated in FIG. 6 and FIG. 7, the circuit board 5 has an insulating substrate 50. The insulating substrate 50 is provided with two through holes 50a that penetrate from the front side board surface to the back side board surface. The number of through holes is equal to or more than the number of terminals 11 of the fuse 1. The opening of the through hole 50a is circular (see FIG. 9). In FIG. 6 and FIG. 7, as to the insulating substrate 50, the upper board surface corresponds to the front side board surface, and the lower board surface corresponds to the back side board surface.

Multiple wiring patterns 52 having conductivity are arranged on the front side board surface of the insulating substrate 50. Multiple wiring patterns 52 are also arranged on the back side board surface of the insulating substrate 50. As to the circuit board 5, the inner surface of each through hole 50a is coated with substrate plating 51. The substrate plating 51 has conductivity. The peripheral portions of each through hole on both of the front side board surface and the back side board surface are covered with the wiring pattern 52. In addition to the inner surface of the through holes 50a, the peripheral portions of the through holes 50a on the front side board surface and the back side board surface are coated with the substrate plating 51 via the wiring pattern 52. In FIG. 6, the substrate plating 51 coats the peripheral portion of the through hole 50a from above of the wiring pattern 52 and the peripheral portion of the through hole 50a from beneath the wiring pattern 52.

The substrate plating 51 contains a tin component, for example. The wiring pattern 52 is made of copper, for example. The substrate plating 51 is in contact with the wiring pattern 52 so as to be conductive thereto. The substrate plating 51 is covered with a resist 53 having insulating properties at the part other than the internal surface and the peripheral portion of the through holes 50*a*.

The area of each through hole 50*a* is slightly larger than the cross-sectional area of the second plate portion 21 of the terminal 11. The second plate portion 21 of the terminal 11 can thus be inserted into the through hole 50*a*. In the case where the second plate portion 21 is inserted into the through hole 50*a*, the first plate portion 20 is too wide to pass through the through hole 50*a* and thus abuts against the substrate plating 51 around the through hole 50*a*. Since the leading end surfaces at the first ends of the two first plate portions 20 are flush with each other, the fuse 1 is stably supported by the circuit board 5.

In the case where the fuse 1 is attached to the circuit board 5, paste-like solder H is applied onto the substrate plating 51 coating the front side board surface of the insulating substrate 50. The second plate portions 21 of the two terminals 11 are respectively inserted into the two through holes 50*a* from the front side of the insulating substrate 50, that is, from above of FIG. 6 and FIG. 7 while the solder H is applied to the substrate plating 51. The first plate portions 20 of the two terminals 11 are supported by the substrate plating 51 coating the front side board surface. A part of the second plate portions 21 protrudes beyond the back side board surface of the circuit board 5.

In this state, the fuse 1 and the circuit board 5 pass through a reflow furnace. In the reflow furnace, the fuse 1 and the circuit board 5 are blown with hot air or irradiated with infrared rays. This causes the paste-like solder H to melt, so that the solder H connects the terminal 11 with the substrate plating 51. Specifically, as illustrated in FIG. 6 and FIG. 7, part of the solder H adheres to the plate-like surface and the leading end surface of the first plate portion 20 of the terminal 11 that is exposed from the housing 10 around the axis of the first plate portion 20 and adheres to the substrate plating 51 that coats the front side board surface of the insulting substrate 50.

In addition, part of the molten solder H enters the through hole and adheres to the substrate plating 51 coating the inner surface of the through hole 50*a* and the plate-like surface and the end surface of the second plate portion 21 of the terminal 11. The solder H has conductivity. The terminal 11 and the substrate plating 51 are made conductive by the solder H. The two terminals 11 held by the fuse 1 are connected to the two regions of the substrate plating 51 on the circuit board 5 by the solder H. This realizes the on-vehicle device 6.

As described above, in the on-vehicle device 6, the fuse 1 is attached to the circuit board 5. The two terminals 11 are respectively inserted into the two through holes 50*a*. The two terminals 11 are respectively connected to the two regions of the substrate plating 51 by the solder H. The on-vehicle device 6 has multiple circuit elements including the fuse 1. The circuit elements different from the fuse 1 are also attached to the circuit board 5.

In one example of the reflow soldering method, the circuit board 5 into which the fuse 1 is inserted passes through a first region and a second region in this order inside the reflow furnace. The temperature in the first region is the temperature in the range from 170 to 190 degrees. The circuit board 5 is located at the first region for a period of 80 to 140 seconds. The temperature in the second region is the temperature in the range from 230 to 250 degrees. The circuit board 5 is located at the second region for a period of 60 to 90 seconds.

In the case where the fuse 1 is attached to the circuit board 5 by the reflow soldering method, the housing 10 is blown with hot air or irradiated with infrared rays. At this time, the temperature of the housing 10 rises. The housing 10 of the fuse 1 has heat resistance. Thus, in the case where the temperature of the housing 10 is equal to or lower than X degrees, no deformation or no melting occurs to the housing 10. Here, X is a positive real number. As to the housing 10, the heat resistance equal to higher than 300 degrees means that X is equal to or more than 300. If no deformation or melting occurs to the housing 10, the shape of the housing 10 is maintained. The housing 10 has heat resistance equal to or higher than 300 degrees. Accordingly, if the temperature of the housing 10 is lower than 300 degrees, the shape of the housing 10 is maintained without occurrence of deformation or melting to the housing 10. Thus, no melting or deformation caused by blowing of hot air or irradiation of infrared rays occurs to the housing 10. The structure of the fuse 1 is suitable for attachment to the circuit board 5 using the reflow soldering method.

In addition, not only the housing 10 but also the fuse 1 has heat resistance. Thus, in the case where the temperature of the fuse 1 is equal to or lower than Y degrees, the pre-arcing characteristics of the fuse 1 is not virtually changed, and long-term reliability of the fuse 1 is practically not reduced. As to the fuse 1, the heat resistance equal to or higher than 300 degrees means that Y is equal to or more than 300. The fuse 1 has heat resistance equal to or higher than 300 degrees. Therefore, if the temperature of the fuse 1 is lower than 300 degrees, the pre-arcing characteristics of the fuse 1 is not substantially changed, and the long-term reliability of the fuse 1 is not substantially reduced. The pre-arcing characteristics show the relation between current flowing through the fuse 1 and the pre-arcing time from when current starts to flow to when blowout of the fusible portion 12 occurs. The pre-arcing characteristics show pre-arcing times for various current. The long-term reliability is the lifetime during which the fuse 1 functions normally as specified in the specification. It is not desirable to shorten the lifetime of the fuse 1 caused by attachment using the reflow soldering method.

Examples of a heat-resistant resin used for manufacturing the housing 10 include nylon resin.

As described above, at each terminal 11, the surface of the metal body 30 is coated with the tin terminal plating 31. The solder H usually contains a tin component. Thus, the terminal 11 coated with the terminal plating 31 of tin has high solder H conformability, that is, wettability. This allows the solder H to strongly adhere to the terminal 11.

Note that the material of the terminal plating 31 is not limited to tin, but may be alloy containing a tin component, for example.

As described above, as to each terminal 11, the second plate portion 21 protrudes from the leading end surface of the first plate portion 20 to achieve a stepped structure. The first plate portion 20 abuts against the substrate plating on the insulating substrate 50 without passing through the hole 50*a*, which allows the housing 10 to be spaced apart from the circuit board 5. This makes it possible to easily form fillet-shaped solder H when the terminal 11 is attached to the circuit board 5 with solder H. Formation of such fillet-shaped solder H means that favorable mounting is achieved.

Moreover, the terminal 11 is inserted into the through hole 50*a* while paste-like solder H is applied to the substrate plating 51. The stepped structure achieved as described above prevents the housing 10 from contacting the paste-like solder H in the case where the terminal 11 is inserted into the through hole 50a. This reduces the probability of formation of ball-like solder H in the case where the solder H is melted by the reflow soldering method.

As described above, as to the terminal 11, the cross-sectional area of the second plate portion 21 is smaller than the cross-sectional area of the first plate portion 20, and the second plate portion 21 is slim. This allows the use of a through hole having a small area as a through hole 50a. In this case, the gap between the second plate portion 21 and the through hole is narrow. Thus, even if hot air is blown into the housing 10, for example, the second plate portion 21, i.e., the fuse 1 does not tilt too much and the housing 10 stands substantially perpendicular to the board surface of the circuit board 5. As a result, in mounting by the reflow soldering method, the housing 10 need not be fixed in a substantially upright position with a jig, so that inexpensive mounting can be achieved.

As described above, as to the two terminals 11 held by the fuse 1, the distance between the two second plate portions 21 of the two terminals 11 is short since the two second plate portions 21 are positioned inward in the alignment direction of the two terminals 11. Thus, the distance between the two through holes 50a into which the two second plate portions 21 are to be inserted is short. The following describes the effect that can be obtained if the distance between the two through holes 50a is short.

Effect Obtained When Distance Between Two Through Holes 50a Is Short

Figure 8:
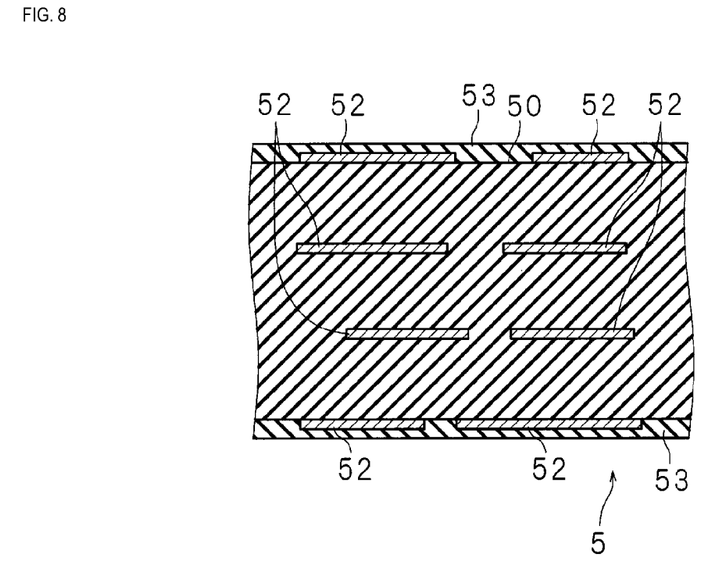
FIG. 8 is a cross-sectional view of the circuit board.

FIG. 8 is a cross-sectional view of the circuit board 5. As described above, as to the circuit board 5, the wiring patterns 52 are provided on the front side board surface and/or the back side board surface of the insulating substrate 50. In the example illustrated in FIG. 8, the wiring patterns 52 are provided on both of the front side board surface and the back side board surface of the insulating substrate 50. As illustrated in FIG. 8, the wiring patterns 52 are also formed inside the insulating substrate 50. In the example illustrated in FIG. 8, the insulating substrate 50 has two layers formed therein, and on each layer, multiple wiring patterns 52 are provided. The connection between the two of the four wiring patterns arranged on the front side board surface, the two layers and the back side board surface is achieved using a via.

Figure 9:
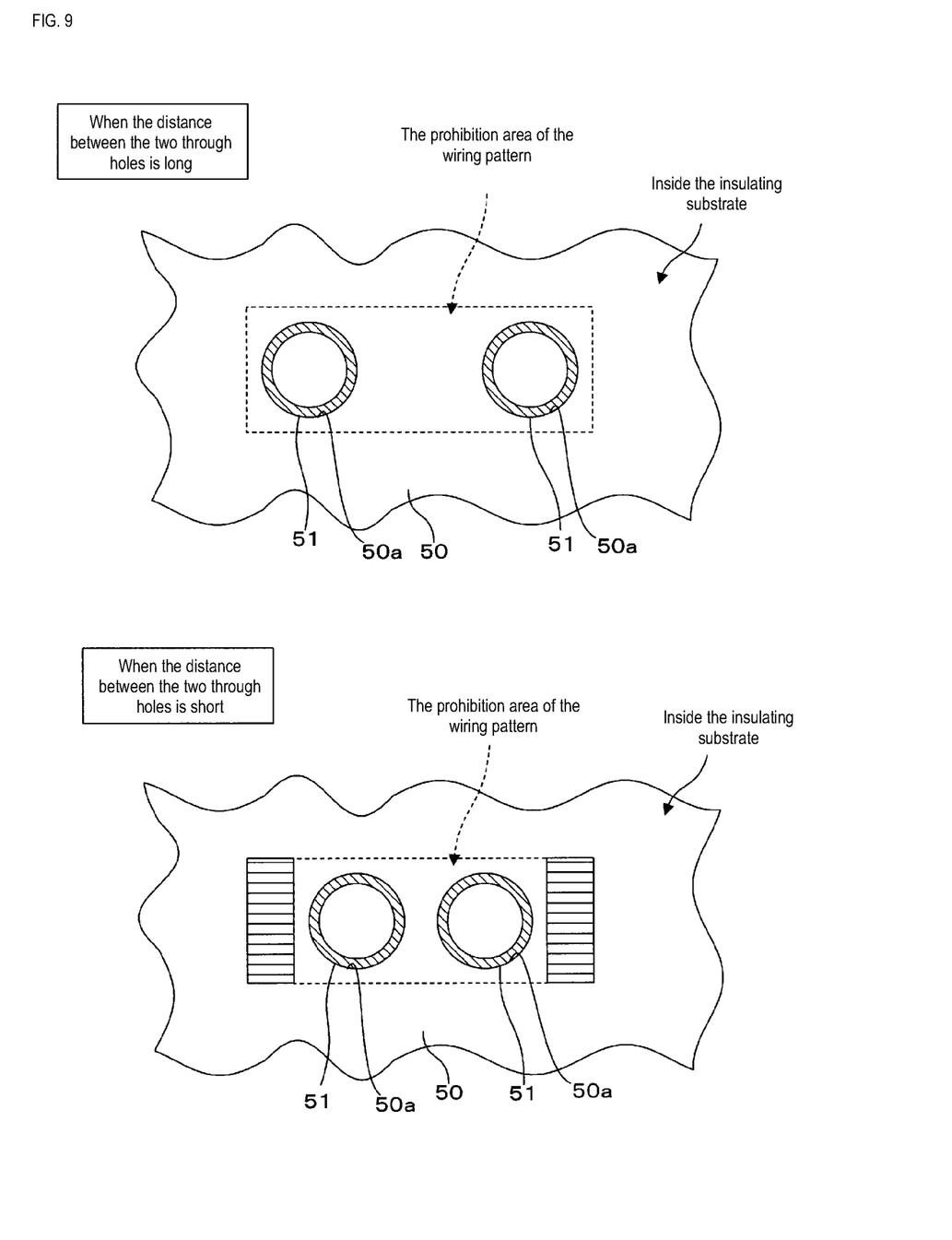
FIG. 9 is an illustrative view of an effect obtained when the distance between two through holes is short.

FIG. 9 is an illustrative view of an effect obtained when the distance between two through holes is short. No wiring pattern 52 is often provided between the two through holes 50a held by the fuse 1. As illustrated in FIG. 9, a prohibition area where formation of the wiring pattern 52 is prohibited is thus wide if the distance between the two through holes 50a is long. On the other hand, the prohibition area of the wiring pattern 52 is narrow by the two areas indicated by the horizontal hatching if the distance between the two through holes 50a is short.

As described above, the distance between the two through holes into which the terminals 11 held by the fuse 1 are to be inserted is short. Thus, inside the insulating substrate 50, the prohibition area of the wiring pattern 52 is narrow, while the permission area where the wiring pattern 52 can be formed is wide. Likewise, on the surface of the insulating substrate 50 as well, the prohibition area of the wiring pattern 52 is narrow, while the permission area where the wiring pattern 52 can be formed is wide. As a result, the wiring pattern 52 has high design flexibility.

Second Embodiment

In the first embodiment, the fuse 1 has two terminals 11 though the number of terminals 11 held by the fuse 1 is not limited thereto.

The following describes a second embodiment focusing on the differences from the first embodiment. Since the configurations other than those described below are in common with configurations of the first embodiment, the components common to the first embodiment are denoted by the same reference codes and the description thereof will not be repeated.

Structure of Fuse 1

Figure 10:
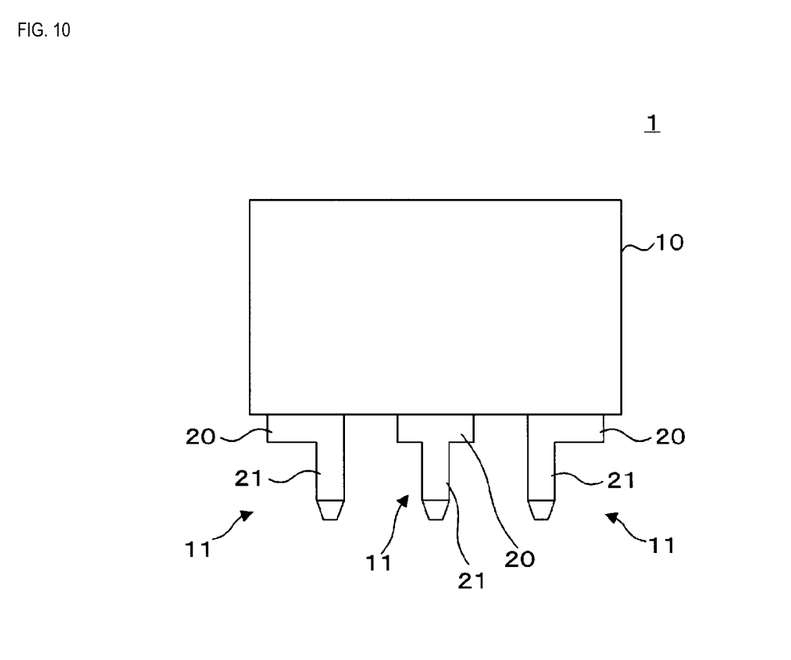
FIG. 10 is a front view of a fuse according to a second embodiment.

FIG. 10 is a front view of a fuse 1 according to a second embodiment. The side of the fuse 1 in the second embodiment is similar to the side of the fuse 1 illustrated in FIG. 2. As to the fuse 1 in the second embodiment, three terminals 11 protrude beyond one common face (open side) of the housing 10. Each terminal 11 has conductivity.

Figure 11:
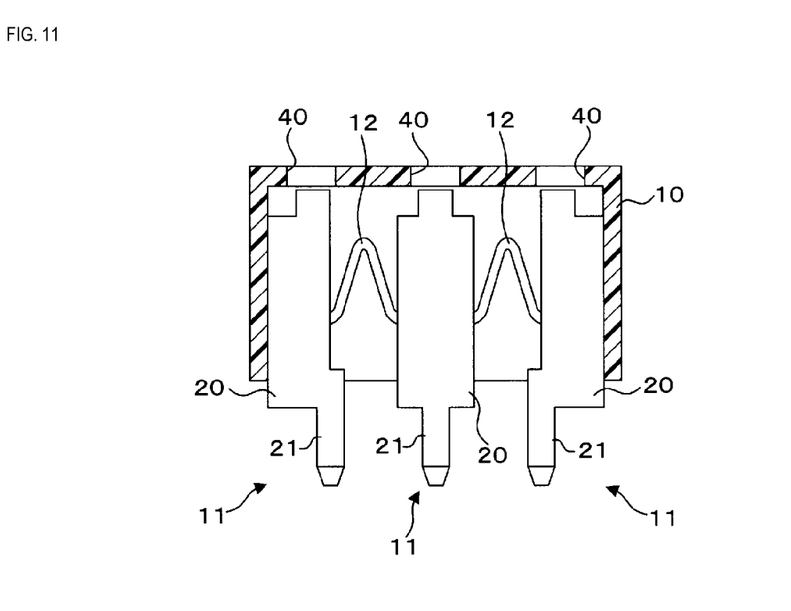
FIG. 11 is a cross-sectional view of the fuse.

FIG. 11 is a cross-sectional view of the fuse 1. As illustrated in FIG. 2, FIG. 10 and FIG. 11, a part of each of the three terminals 11 is covered with the housing 10. As illustrated in FIG. 11, the three terminals 11 are aligned with each other inside the housing 10. The fuse 1 has two fusible portions 12. The two adjacent terminals 11 are connected by the fusible portion 12. The two fusible portions 12 are also covered with the housing 10.

An electrical circuit with the fuse 1 includes a circuit in which the fuse 1 is connected to a battery and two loads. Specifically, the terminal 11 at the center is connected to the positive electrode of the battery. The two terminals 11 positioned on both sides are each connected to one end of the load via a switch. The negative electrode of the battery and the other ends of the loads are grounded. The two loads are the electrical devices mounted on the vehicle. If the switch of the terminal 11 on the left of FIG. 11 is on, current flows through the terminal 11 at the center, the fusible portion 12 and the terminal 11 on the left in this order. Likewise, if the switch of the terminal 11 on the right of FIG. 11 is on, current flows through the terminal 11 at the center, the fusible portion 12 and the terminal 11 on the right in this order.

As described in the first embodiment, in the case where current flows through the fusible portion 12, the fusible portion 12 generates heat. If the temperature of the fusible portion 12 exceeds a predetermined temperature, e.g., 420 degrees, the fusible portion 12 is blown out.

As in the first embodiment, each terminal 11 has a long-plate shape. The plate-like surfaces (wide surface) of the three terminals 11 are aligned with each other. One ends of the three terminals 11 protrude beyond a common face of the housing 10 downward in FIG. 11. As to each terminal 11, an end of a first plate portion 20 having a long-plate shape is connected to an end of a second plate portion 21 having a long-plate shape. A part of the first plate portion 20 is covered with the housing 10. A first end of the first plate portion 20 protrudes downward in FIG. 11 beyond the common face of the housing 10 as described above. The common face of the housing is in parallel with the leading end surface of the first end of the first plate portion 20. Furthermore, as to the three terminals 11, the leading end surfaces of the first ends of the three first plate portions 20 are flush with each other.

Note that the plate-like surfaces of the three terminals 11 are flush with each other.

Note that the common face and the leading end surface do not need to be completely parallel, but may also be substantially parallel. Also, the three leading end surfaces are not necessarily flush with each other. The fact that the three end surfaces are flush with each other means that there is practically no step height between the two farthest leading end surfaces. Accordingly, if the step height between the two farthest leading end surfaces is a value within a design error range, the three leading end surfaces are flush with each other.

At each terminal 11, the second plate portion 21 protrudes from a part of the leading end surface at the first end of the first plate portion 20 along the lengthwise direction of the first plate portion 20. The cross-sectional area of the second plate portion 21 is smaller than the cross-sectional area of the first plate portion 20, and the second plate portion 21 is slimmer than the first plate portion 20. The first plate portion 20 and the second plate portion 21 have the same thickness, and the plate-like surface of the first plate portion 20 and the second plate portion 21 are continuous. The first plate portion 20 and the second plate portion 21 have the same lengthwise direction, the lengthwise direction corresponding to the up-down direction in FIG. 11.

Note that the first plate portion 20 and the second plate portion 21 may have substantially the same thickness, not necessarily having completely the same thickness. The first plate portion 20 and the second plate portion 21 may have substantially the same lengthwise direction, not necessarily having completely the same lengthwise direction.

As to the terminals 11 positioned on both sides out of the three terminals 11 in the alignment direction, the two second plate portions 21 are positioned inward in the alignment direction. The alignment direction is a right-left direction in FIG. 11. Accordingly, as to the terminal 11 on the left in FIG. 11, the second plate portion 21 protrudes from the rightward edge of the leading end surface at the first end of the first plate portion 20. As to the terminal 11 on the right, the second plate portion 21 protrudes from the leftward edge of the leading end surface at the first end of the first plate portion 20. Sine the two second plate portions 21 protrude as described above, the distance between the second plate portions 21 of the two terminals 11 positioned on both sides is short.

As to the terminal 11 at the center, the second plate portion 21 may only have to protrude from the leading end surface of the first end of the first plate portion 20. In the example in FIG. 11, the second plate portion 21 protrudes from the center of the leading end surface at the first end of the first plate portion 20.

As to each terminal 11, the tip of the second plate portion 21 has a truncated-pyramidal shape as in the first embodiment, and the second plate portion 21 has the cross-sectional area that increases toward the housing 10 and decreases away from the housing 10. The cross-sectional area here is, as described above, an area of the cross section obtained by cutting the second plate portion 21 along the width direction of the second plate portion 21, i.e., the right-left direction in FIG. 10 and FIG. 11.

As illustrated in FIG. 11, the fusible portion 12 is each located between the first plate portions 20 of the two adjacent terminals 11. One end of the fusible portion 12 is connected to a side surface of the first plate portion 20 of one of the terminals 11. The other end of the fusible portion 12 is connected to a side surface of the first plate portion 20 of the other one of the terminals 11. The two sides to which the fusible portion 12 is connected face each other. The fusible portion 12 is bent and is generally in the form of V. In the example illustrated in FIG. 11, the fusible portion 12 is bent upward in FIG. 11.

Note that the fusible portion 12 is not limited to a V shape, but may have an S shape, for example.

The fuse 1 according to the second embodiment has three openings corresponding to the three terminals 11 as in the first embodiment. Second ends of the first plate portions 20 of the three terminals 11 respectively face the three openings 40. The user of the fuse 1 uses a tester, for example, to measure the resistance between the two terminals 11. The user can confirm whether or not each of the two fusible portions 12 is blown out based on the measured resistance value.

Attached State of Fuse 1

Figure 12:
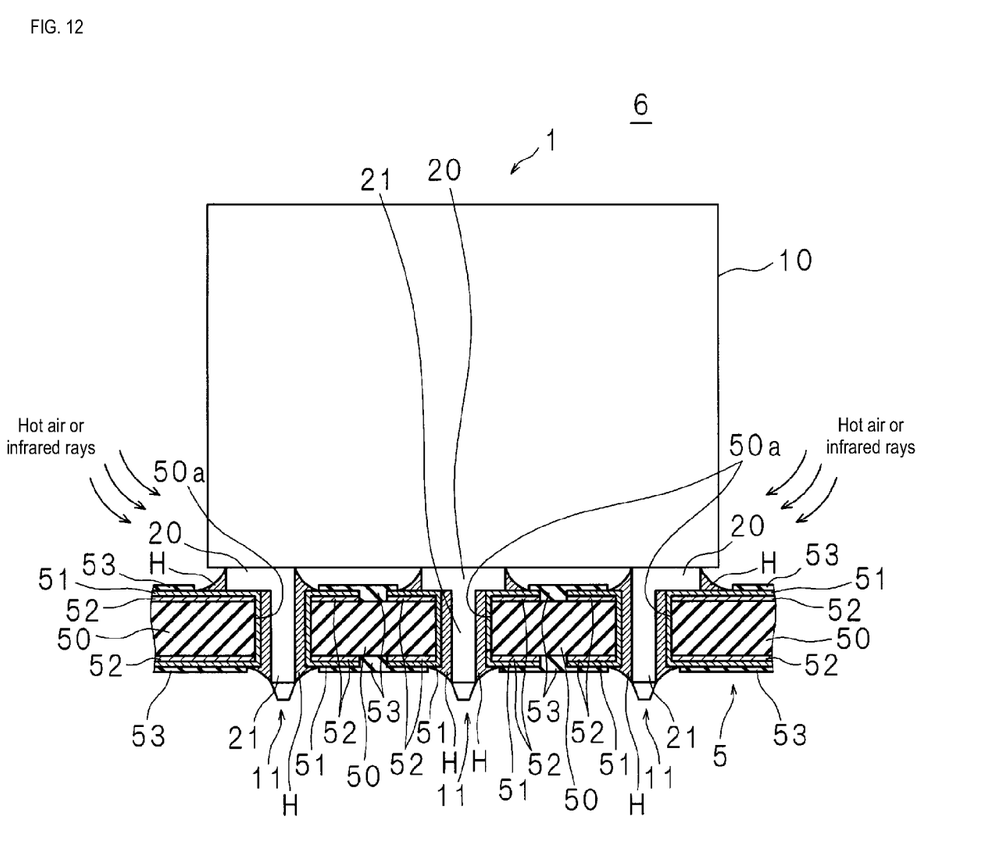
FIG. 12 is an illustrative view of a fuse attached to a circuit board.

FIG. 12 is an illustrative view of the fuse 1 attached to a circuit board 5. FIG. 12 corresponds to FIG. 6. FIG. 12 illustrates a cross section of the circuit board 5. An insulating substrate 50 of the circuit board 5 according to the second embodiment is provided with three through holes 50a corresponding to the three terminals held by the fuse 1. The three through holes 50a are aligned. As in the first embodiment, the inner surface of each through hole 50a is coated with substrate plating 51. The peripheral portions of each through hole 50a on the front side board surface and the back side board surface are covered with the wiring pattern 52. In addition to the inner surface of the through holes 50a, the peripheral portions of the through holes 50a on the front side board surface and the back side board surface are coated with substrate plating 51 via the wiring pattern 52. In FIG. 11 the substrate plating 51 coats the peripheral portion of the through hole 50a from above of the wiring pattern 52 and the peripheral portion of the through hole 50a from beneath the wiring pattern 52.

As in the first embodiment, the second plate portions 21 of the three terminals 11 are inserted into the three through holes 50a. Using the reflow soldering method, the three terminals 11 held by the fuse 1 are connected with solder H to the three regions of the substrate plating 51 on the circuit board 5. This realizes the on-vehicle device 6.

As in the first embodiment, in the on-vehicle device 6, the fuse 1 is attached to the circuit board 5. The three terminals 11 are respectively inserted into the three through holes 50a. The three terminals 11 are respectively connected with solder H to the three regions of the substrate plating 51. The housing 10 of the fuse 1 has heat resistance equal to or higher than 300 degrees. The fuse 1 also has heat resistance of equal to or higher than 300 degrees. The on-vehicle device 6 has multiple circuit elements including the fuse 1. The circuit elements different from the fuse 1 are also mounted on the circuit board 5.

Figure 13:
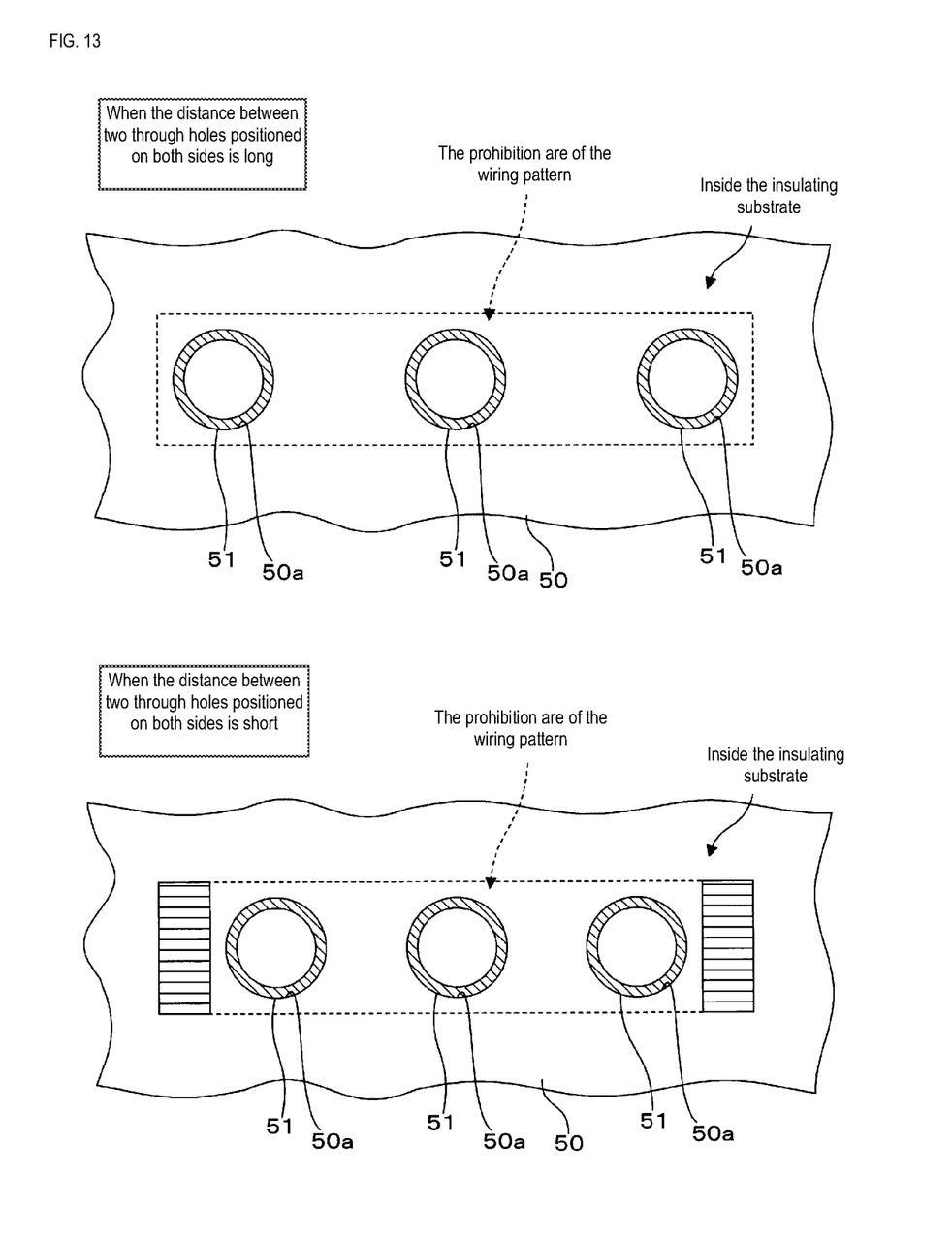
FIG. 13 illustrates an effect obtained when the distance between two through holes positioned on both sides is short.

Effect Obtained When Distance Between Two Through Holes 50a on Both Sides Is Short FIG. 13 is an illustrative view of an effect obtained when the distance between two through holes positioned on both sides is short. As described in the first embodiment, as to the circuit board 5, the wiring pattern 52 is also formed inside the insulating substrate 50. No wiring pattern 52 is often provided between the two adjacent through holes 50a. Thus, as illustrated in FIG. 13, the prohibition area where formation of the wiring pattern 52 is prohibited is wide if the distance between the two through holes 50a positioned on both sides is long. On the other hand, the prohibition area of the wiring pattern 52 is narrow by the two areas indicated by the horizontal hatching if the distance between the two through holes 50a positioned on both sides is short.

As described above, the distance between the two through holes 50a into which the two terminals 11 held by the fuse 1 are to be inserted is short. Thus, inside the insulating substrate 50, the prohibition area of the wiring pattern 52 is narrow, while the permission area where the wiring pattern 52 can be formed is wide. Likewise, on the surface of the insulating substrate 50 as well, the prohibition area of the wiring pattern 52 is narrow, while the permission area of the wiring pattern 52 is wide. As a result, the wiring pattern 52 has high design flexibility. The wiring pattern 52 described here is a wiring pattern having potential different from that of the substrate plating 51.

The fuse 1 and the on-vehicle device 6 according to the second embodiment 2 have the same effects as the fuse 1 and the on-vehicle device 6 according to the first embodiment.

Note that in the second embodiment 2, the number of terminals 11 possessed by the fuse 1 may be more than four, not limited to three. In this case, multiple fusible portions 12 are each connected to a common terminal 11 and any one of the rest of the terminals 11. Thus, assuming that the number of terminals 11 is represented by N, N is a whole number equal to or lager than 4. The number of fusible portions 12 is (N−1), and (N−1) fusible portions 12 are connected to the common terminal 11. The common terminal 11 is a terminal that is connected to the battery, for example, and the rest of the terminals 11 are terminals that are connected to the load.

Note that the terminal 11 is not limited to such a configuration that the second plate portion 21 protrudes from the leading end surface of the first plate portion 20. The terminal 11 may be formed in the first plate portion 20 that is long enough. In this case, the opening of the through hole 50a is rectangular, and the first plate portion 20 is inserted into the through hole 50a on the circuit board 5. The first plate portion 20 is connected to the substrate plating 51 by solder H.

It is to be understood that the first and second embodiments disclosed here are illustrative in all respects and not restrictive. The scope of the present disclosure is defined by the appended claims, not by the above-mentioned meaning, and all changes that fall within the meanings and the bounds of the claims, or equivalence of such meanings and bounds are intended to be embraced by the claims.

The invention claimed is:

1. A fuse to be provided in an on-vehicle device, comprising:
a plurality of terminals each having a long-plate shape that are aligned;
a fusible portion connected to two of the plurality of terminals; and
a housing covering the fusible portion and a part of the plurality of terminals, wherein
the fusible portion is blown out in a case where a temperature of the fusible portion exceeds a predetermined temperature,
the housing has heat resistance equal to or higher than 300 degrees celsius,
each terminal has
a metal body,
terminal plating made of tin covering a surface of the metal body,
a first plate portion having a long-plate shape a part of which is covered with the housing, and
a second plate portion connected to the first plate portion, for each of the plurality of terminals,
one end of the first plate portion protrudes from a common face of the housing,
the second plate portion protrudes from part of a leading end surface of the first plate portion that protrudes from the housing, and
a cross-sectional area of the second plate portion is smaller than a cross sectional area of the first plate portion.

2. The fuse according to claim 1, wherein two terminals of the plurality of terminals on both sides in an alignment direction have two second plate portions positioned inward in the alignment direction.

3. The fuse according to claim 1, wherein the leading end surfaces of a plurality of the first plate portions that protrude from the housing are flush with each other.

4. An on-vehicle device, comprising:
a fuse; and
a circuit board to which the fuse is attached, wherein
the fuse has
a plurality of terminals each having a long-plate shape that are aligned with each other,
a fusible portion connected to two of the plurality of terminals,
a housing covering the fusible portion and a part of the plurality of terminals and having heat resistance,
current flows through the fusible portion,
the fusible portion is blown out in a case where a temperature of the fusible portion is equal to or higher than a predetermined temperature,
the housing has heat resistance equal to or higher than 300 degrees celsius,
each terminal has
a metal body,
terminal plating made of tin covering a surface of the metal body,
a first plate portion having a long-plate shape a part of which is covered with the housing, and
a second plate portion connected to the first plate portion, wherein
for each of the plurality of terminals,
one end of the first plate portion protrudes from a common face of the housing,
the second plate portion protrudes from part of a leading end surface of the first plate portion that protrudes from the housing,
a cross-sectional area of the second plate portion is smaller than a cross sectional area of the first plate portion,
the circuit board has
an insulating substrate,
a plurality of through holes that penetrate the insulating substrate, and
a plurality of substrate plating coating the insulating substrate, and
the plurality of terminals are respectively inserted into the plurality of through holes and connected to the plurality of substrate plating with solder.

5. The fuse according to claim 2, wherein the leading end surfaces of a plurality of the first plate portions that protrude from the housing are flush with each other.

* * * * *